Sept. 4, 1934.   J. A. SPENCER   1,972,169
VALVE
Original Filed July 5, 1929
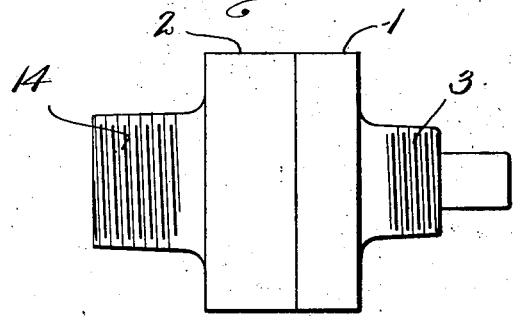
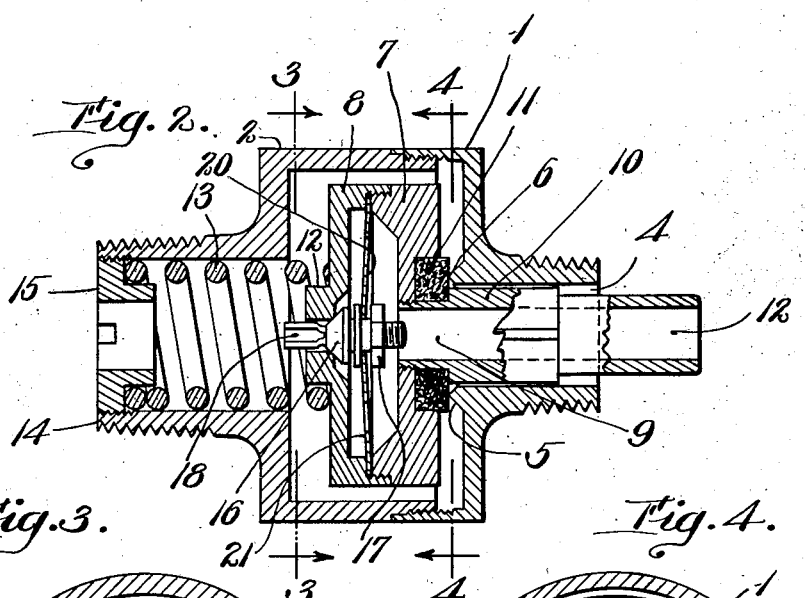
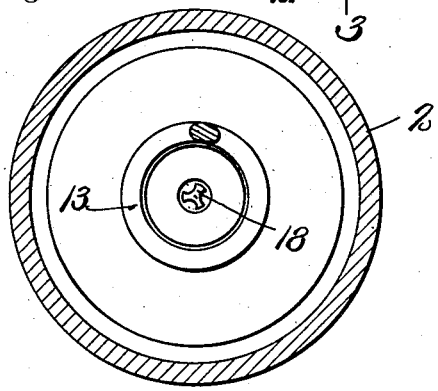
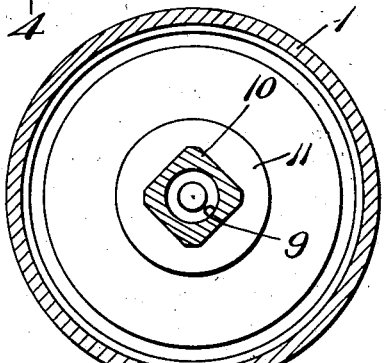

Patented Sept. 4, 1934

1,972,169

UNITED STATES PATENT OFFICE 1,972,169

VALVE

John A. Spencer, Newton, Mass., assignor to Spencer Thermostat Company, Cambridge, Mass., a corporation of Massachusetts Application July 5, 1929, Serial No. 376,094
Renewed November 2, 1933

6 Claims. (Cl. 137—139)

This invention relates to valves and particularly to a combined thermostatic and pressure relief valve.

In the heating of water for uses in which the desired water temperature is below a certain limit (for example, 212° F.) an unnecessary danger arises if the water in the hot water storage tank or system exceeds this temperature limitation. If the hot water storage tank or system should burst for any cause whatsoever while the water was above the limit, a portion of the water would flash into steam with explosive force as it escaped. It is the purpose of the valve of the present invention to open in order to drain off excessive hot water, allowing cold water to come in to the system to reduce the water temperature, and to reclose when a safe water temperature is restored. In the same system, in order to provide for excessive pressures, a pressure relief valve is also to be desired. While it is possible to have two separate valve structures of these types, it is desirable that the two valves be combined into a unitary structure requiring minimum of piping and plumbing to install.

As there are many other uses to which the combination temperature and pressure relief valve of this invention may be put, the foregoing is merely one example and not a limitation upon the scope of the claims of this invention. Other uses will be apparent from the description of the valve.

In general this invention comprises a thermostatically controlled valve in which the thermostatic element is a snap acting member and controls a valve. This thermostatically controlled valve is in a casing which itself forms a valve in conjunction with a spring for the relief of pressure. Preferably the thermostatically controlled valve is so disposed that the pressure against which the pressure relief valve is to protect does not have any tendency to open said thermostatically controlled valve. In this way the temperature and pressure are independently protected.

Referring to the drawing, Figure 1 shows a view of the combined pressure and thermostatic relief valve.

Figure 2 is a sectional view of the valve.

Figures 3 and 4 are sections taken on lines 3—3 and 4—4 respectively of Figure 2.

The valve comprises an outer housing of two members 1 and 2 being suitably tapped and threaded so that they may be screwed together to form a unitary structure. Portion 1 of the housing has a reduced portion 3 having screw threads cut upon the outside thereof and having an aperture 4 therethrough. Upon the inner portion of member 1 is an annular protuberance 5 terminating in a sharp edge 6.

Within the outer housing is an inner housing composed of two members 7 and 8. Member 7 has an aperture 9 through its central portion into which an elongated metal member 10 is secured. This elongated member 10 retains a washer 11 of rubber or any other suitable material against member 7. Elongated member 10 has a central channel 12 therethrough and at its inward portion has a rectangular cross section with rounded edges as indicated in Figure 4. In this way the inner housing composed of members 7 and 8 is suitably centered within the outer housing by the engagement of the rounded edges of member 10 in channel 4. At the same time a channel for the passage of liquid is provided between member 10 and channel 4 of member 1. The outer portion of member 10 is here shown as cylindrical. It is clear, however, that this portion of member 10 may be entirely omitted if desired.

Member 8 of the inner housing has a central projecting portion 12 around which are the coils of a helical spring 13. Outer member 2 is provided with a projecting portion 14 having external and internal screw threads cut out thereon. A nut 15 engages the inner threads and serves to adjust the compression of spring 13. It is evident therefore that the inner housing 7 and 8 is centered within the outer housing by means of member 10 in channel 4 and by means of spring 13 engaging portion 12. Spring 13 presses the entire inner housing against the inside surface of member 1 and thus forces the soft washer 11 tightly against the edge 6 of protuberance 5. This in effect forms a pressure relief valve.

Members 7 and 8 forming the inner housing have suitable threads cut thereon so that they may be tightly screwed together. Before these two parts are thus put together a cupped bimetallic disk 21 more fully disclosed and claimed in my prior Patent 1,448,240 is inserted. Preferably the fit of the edge of the disk in the housing is such that the disk will not bind and may snap back and forth in accordance with temperature variations as fully disclosed in the above patent. This disk is apertured at 20 and at its center carries valve member 16 loosely maintained in the center of the disk by a bolt 17. It is clear that bolt 17 also provides an adjusting means whereby the temperature at which the disc 21 operates may be varied. Valve member 16 is frusto-conical in shape and its smaller end carries an elongated member 18 having a Y cross section as shown in Figure 3. Member 18 has rounded edges and engages a central aperture through member 8 and thus serves to center the valve 16 while at the same time allowing a discharge passage through the aperture.

The operation of this valve is as follows. The entire structure is so connected to a boiler or similar device that portion 3 is directly in communication with the liquid therein. Portion 14 may carry a suitable piping system for the discharge of water escaping from the boiler. It is evident that the water pressure is exerted through channel 4 against a small annular surface of flexible washer 11. Pressure is also exerted through channel 12 in member 10 and against the inner surface of member 8. Since bimetallic disk 21 has apertures therethrough it is evident that the pressure is substantially equal on both sides thereof, the only unbalance being that due to the projected area within the seat of the valve member 16. In case the water pressure exceeds a certain value determined by the compression of spring 13 and the area upon which the water pressure acts, the entire inner housing will be forced to the left compressing the spring and unseating flexible washer 11 from valve seat 6. Water will thereupon flow around member 10 in Figure 4 and between the inner and outer housings and out through member 14. It is clear that the water pressure will have no tendency to open valve 16 controlled by bimetallic disk 21.

If the water should become too hot the temperature of the disk will be raised so that it will snap to its other position of opposite curvature and withdraw valve 16 from its valve seat. The hot water will then escape through channel 12 in member 10 through apertures 20 in bimetallic disk 21 and through the aperture in member 8.

Due to the arrangement of the pressure relief valve 6, whereby it closes up stream, and the temperature relief valve 16, whereby it closes down stream, the device as a whole is adapted to function as a vacuum relief valve as well. This will be understood when it is considered that, should the pressure in the hot water apparatus fall below atmospheric, this sub-atmospheric pressure will exist in the passages 4 and 12, up to the valves 6 and 16, respectively. The atmospheric pressure in the outlet portions of the device will then exert itself in helping to seat the pressure valve 6 more tightly, as it closes up stream; but as to the temperature relief valve 16, the greater atmospheric pressure will tend to unseat and hence open the valve, as it closes down stream and this pressure is in the nature of an up stream force.

Since the bimetallic disk tends to reverse its curvature with extreme suddenness and force, it is evident that the thermostatic control exercised by the valve is substantially independent of pressure. Whatever slight pressure may be exerted against the small surface of valve 16 will be more than overcome by the sharp impact given the valve by bimetallic disk in reversing curvature.

It is evident therefore that I have devised a simple and exceedingly compact valve structure in which pressure and temperature conditions are protected against in a boiler or the like.

I claim:

1. A combined thermostatic and pressure relief valve comprising a housing, a pressure relief valve within said housing comprising a smaller housing having a member extending outwardly therefrom, said outwardly extending member serving to center said smaller housing within the larger housing, resilient means pressing on said smaller housing, the inner housing having an annular space around it for the escape of liquid through said valve, and a thermostatic valve within said inner housing, said inner housing having a passage therethrough controlled by said thermostatic valve.

2. A combined thermostatic and pressure relief valve comprising an outer housing, a pressure relief valve within said housing and comprising an inner housing having an elongated hollow member attached thereto, said elongated hollow member having means to center said inner housing with respect to said outer housing in such a manner as to form an annular space between said two housings to form a passage through the valve, said inner housing containing a thermostatically controlled valve, said valve being so arranged as to be maintained in a closed position by pressure tending to operate the pressure relief valve.

3. A combined thermostatic and pressure relief valve comprising a hollow housing, a pressure relief valve within said housing and comprising a smaller housing, means for maintaining said smaller housing in symmetrical relationship to said larger housing to form an annular space between said housings, said two housings cooperating with each other to form a pressure relief valve, adjustable resilient means for varying the pressure of said smaller housing on said larger housing, a thermostatic valve within said smaller housing, comprising a cupped bimetallic disk having apertures therethrough and a valve directly connected to said disk and cooperating with a valve seat.

4. A combined thermostatic and pressure relief valve comprising an outer housing having an outer reduced portion extending from one side thereof, a channel through said outer reduced portion and giving access to the interior of said housing, a valve seat formed on the inside of said housing, an inner housing within said housing, said inner housing having a reduced portion extending therefrom within said outer reduced portion, said reduced portion having a channel giving access to the interior of said inner housing, means on said reduced portion of said inner housing for centering said inner housing with respect to said outer housing, while giving access for passage of a liquid between said two reduced portions, a snap acting thermostat within said inner housing, a valve connected to said snap acting thermostat and cooperating with a valve seat in said inner housing, said thermostat being so arranged that the pressure on all sides is substantially the same, and resilient means pressing the inner housing and its reduced portion against the outer housing and its reduced portion.

5. A safety relief device comprising a casing, inlet means providing for open communication between said casing and a fluid supply, outlet means for discharging fluid from the casing, said casing being provided with two separate means of communication between its inlet and its outlet means, a pressure valve normally closing one of said means of communication against outflow therethrough but yieldable only under excess pressure to allow the outflow of fluid from the casing, a second valve normally closing the other means of communication at least in part under the pressure of fluid in said casing, and temperature-responsive means for unseating the said second valve and keeping it open while the temperature of the fluid is in excess of a predetermined temperature, said second valve automatically closing when the fluid temperature falls below a predetermined temperature.

6. A relief valve comprising a body having inlet and outlet passages, said passages having a plurality of communicating openings, one of which openings is normally closed by a pressure relief valve and the other of which is normally closed by a thermostatically controlled valve, said pressure relief valve being adapted to close up stream and said thermostatically controlled valve being adapted to close down stream, said thermostatically controlled valve comprising a thermostatic arrangement adapted to be actuated by subnormal internal pressure to provide passage through its corresponding opening.

JOHN A. SPENCER.